United States Patent [19]
Pearson

[11] 3,810,050
[45] May 7, 1974

[54] RELAY CLUTCH TIMER
[75] Inventor: Frank Arthur Pearson, Moline, Ill.
[73] Assignee: Gulf & Western Industries, Inc., New York, N.Y.
[22] Filed: Nov. 16, 1972
[21] Appl. No.: 307,300

Related U.S. Application Data
[62] Division of Ser. No. 165,142, July 22, 1971, Pat. No. 3,725,616.

[52] U.S. Cl. .............................. 335/75, 200/38 B
[51] Int. Cl. ........................................ F16d 27/10
[58] Field of Search ................... 200/38 B; 335/75

[56] References Cited
UNITED STATES PATENTS

| | | | |
|---|---|---|---|
| 3,476,892 | 11/1969 | Simmons et al. | 200/38 B |
| 2,325,860 | 8/1943 | Kizaur | 335/75 X |
| 3,713,053 | 1/1973 | Mahon | 335/75 |
| 3,449,699 | 6/1969 | Davin | 200/28 B X |

Primary Examiner—Robert K. Schaefer
Assistant Examiner—William J. Smith
Attorney, Agent, or Firm—Meyer, Tilberry & Body

[57] ABSTRACT

An adjustable reset timer for providing delayed time sequences for electrical circuits. In the timer, an adjustable cam member, including a cam hub having a serrated face is disposed about the drive shaft of a synchronous motor in a free wheeling relationship therewith. A clutch hub member, also having a serrated face, is received over the drive shaft in rotational driving engagement therewith and is axially shiftable along the drive shaft between engaging and non-engaging positions relative to the cam hub. In the engaging position, the serrations on the hubs mate to form a rotational driving connection therebetween so that in that position, the cam member is rotatably driving from a non-engaging to an energizing position relative to at least one load switch. The clutch hub is normally biased toward the engaging position but is prevented from engagement with the cam hub by a retaining lever. The lever is disposed in an operative relationship with an electrical relay which is selectively energizable and de-energizable to permit the lever to be moved between retaining and non-retaining conditions with resultant corresponding movement of the cam hub between the non-engaging and engaging positions.

4 Claims, 11 Drawing Figures

RELAY CLUTCH TIMER

This is a division, of application Ser. No. 165,142 filed July 22, 1971, now U.S. Pat. No. 3,725,616, Apr. 3, 1973.

DISCLOSURE

This application pertains to the art of timers and more particularly to a timer having a relay type clutch.

The invention is particularly applicable to an adjustable reset timer for controlling at least one process and will be described with particular reference thereto; however, it will be appreciated that the invention has broader applications and may be employed in conjunction with a variety of devices which require a timed cycle as part of their operation.

It is known in the timer art to provide a reset timer comprising a frame, drive means, clutch armature adapted to rotate through a preselected timing cycle and actuate a switch for controlling a process, drive means extending from the motor to rotate the clutch armature and a clutch means for coupling the drive means to the clutch armature.

Heretofore, the clutch means have taken the form of a relay solenoid or gear train. It had also been the practice to maintain the clutch means as a separate component of the timer and an arm or similar device was employed to engage or disengage the drive means. However, reset timers of this type have had undesirable characteristics which restricted their useful application. One of the primary problems was a tendency towards timing inaccuracies caused by operation of the clutch means itself, particularly the time required for engagement and disengagement between the clutch and drive means.

Improvements on the above mentioned type of reset timer comprised a reset timer wherein a clutch armature was coaxially disposed about the drive shaft of the drive means and adapted to rotate in an operative direction from a selectible predetermined position to a fixed final position. The clutch armature was axially movable into and out of magnetically locked engagement with a rotor whereby the clutch armature and rotor were rotatable in unison in the operative direction when the coil was energized. Although this type of clutch assembly overcame many of the problems encountered with previously utilized reset timers, there remained a serious problem in that the number of component parts required for this type of clutch assembly oftentimes caused maintenance difficulty and added cost to the price of manufacture of the timer. Further, the timing inaccuracies previously encountered remained with those timers using this type of clutch assembly.

The present invention contemplates a new and improved apparatus which overcomes all of the above referred problems and others and provides a new reset timer and clutch assembly which are simple in design, economical to manufacture and provides accurate timed sequences for a plurality of load switches.

In accordance with the present invention, there is provided a reset cycle timer for providing adjustable time delay sequences between the energization of the timer circuit and energization of at least one associated load switch. The timer comprises a cam member disposed for movement between a non-energizing and a second energizing position relative to the load switch and a first hub portion. Drive means, including an elongated drive shaft, are provided for selectively rotatably driving the cam member between the first and second positions and the first hub is received on the drive shaft. A clutch assembly used to interconnect the cam member and drive means includes a second hub portion which is received on the drive shaft for continuous rotation therewith and includes means for moving the second hub portion between non-engaging and mechanically engaging positions relative to the first hub. When the second hub portion is in the engaging position, the cam member is moved from the first toward the second position and when the second hub is in the non-engaging position the cam member is automatically returned to its first position by a spring element acting thereagainst.

In accordance with another aspect of the present invention, the first and second hubs are coaxially disposed about the drive shaft with the first hub in a free wheeling relationship and the second hub in a fixed rotational relationship therewith.

In accordance with another aspect of the present invention, the moving means comprises a biasing element for continuously axially biasing the second hub toward one of the positions and means for retaining the second hub in the other of the positions against the force of the biasing element.

In accordance with yet another aspect of the present invention, the clutch assembly further includes an electrical relay for selectively releasing the retaining means for permitting the biasing element to move the second hub from the other to the one position.

In accordance with still another aspect of the present invention, there is provided a new clutch mechanism for particular use with a reset timer wherein a hub portion of a cam member is disposed about the drive shaft of a means for driving and is selectively rotated to drive the cam member between non-energizing and energizing positions relative to at least one associated load switch. The cam assembly includes a cam hub portion received on and interconnected with the drive shaft for continuous rotation therewith and which is axially movable along the drive shaft between non-engaging and mechanically engaging positions relative to the cam hub. Means for continuously biasing the clutch hub portion toward one of the positions and for retaining the clutch hub in one of the positions against the force of the biasing means. The retaining means are selectively shiftable to permit the clutch hub to be biased toward one of the positions.

The principal object of the present invention is the provision of a new reset timer mechanism.

Another object of the present invention is the provision of a new reset cycle timer which permits accurate timing sequences to be realized.

Another object of the present invention is the provision of a new reset cycle timer which utilizes an electrical relay energized clutch assembly which is simple to manufacture.

Yet another object of the present invention is the provision of a new relay clutch assembly for a reset cycle timer.

Another object of the present invention is the provision of a new relay clutch assembly which provides accurate timed cycles.

Still another object of the present invention is the provision of a new relay clutch assembly for a reset cycle timer which is simple to manufacture.

Another object of the present invention is the provision of a new relay clutch assembly for use with a reset cycle timer which employs a minimum of component parts.

The invention may take physical form in certain parts and arrangements of parts, preferred embodiments of which will be described in detail in this specification and illustrated in the accompanying drawings which form a part hereof and wherein.

Figure 1:
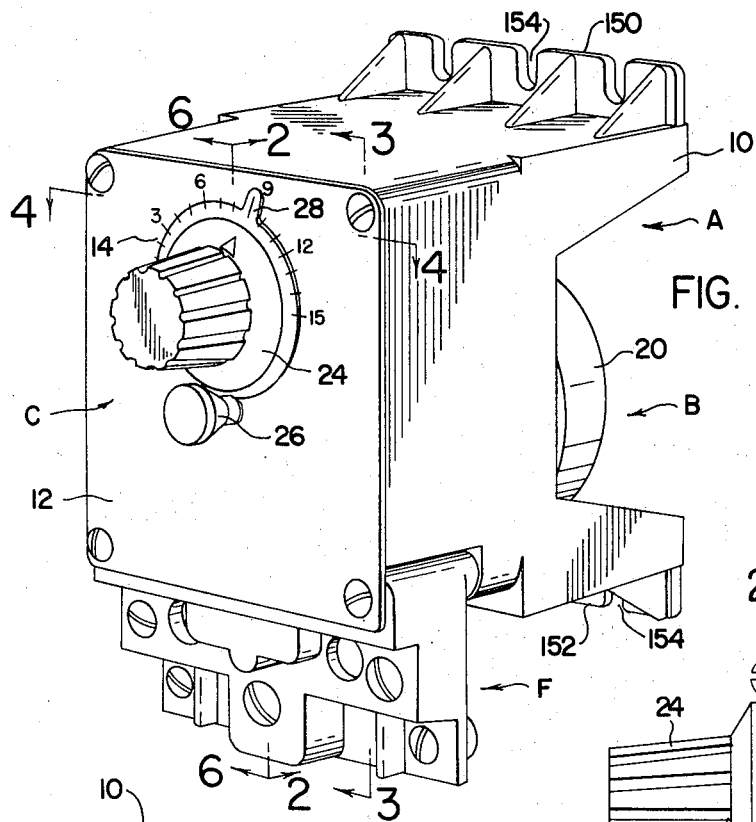
FIG. 1 is a perspective view of a reset cycle time employing the concepts of the subject invention.

Referring now to the drawings wherein the showings are for the purposes of illustrating the preferred embodiments of the invention only and not for purposes of limiting same, the FIGURES show a reset timer utilizing the relay energized clutch of the subject invention which comprises a timer housing A, drive means B, adjustment assembly C, cam assembly D, and clutch assembly E.

More specifically, the timer housing may be injection molded from glass filled Noryl. This material is recognized by Underwriters Laboratories for use as the sole support device of current carrying components because it is flameproof and has high impact resistance and high dimensional stability. It will be appreciated, however, that other materials may be used and that the particular shape of shell 10 may be that suited for a particular timer use. Mounted to the shell by any convenient means, such as for example screws, is a timer face plate 12 including thereon time delay designations 14. The face plate may be of any material, and in the preferred embodiment, is aluminum with the time delay designations painted thereon.

The drive means B comprises a synchronous motor 20 of the type commonly used for this type of timer which has an elongated drive shaft 22 extending through housing 10. The synchronous motor may be mounted to the housing by any convenient means, which in the preferred embodiment, comprise screws.

Adjustment assembly C comprises an adjustment knob 24 having a tightening knob 26 spaced immediately adjacent thereto and adapted to be received in face plate 12 in a known manner. The adjustment knob includes thereon a time delay indicator 28 for association with particular time delay designations 14. Adjustment knob 24 includes a knob mounting shaft 30 extending through face plate 12 coaxially received over drive shaft 12 in a free wheeling relationship therewith. A cam assembly adjustment arm 32 is received over shaft 30 on the inside of face plate 12 to return knob 24 in position and includes an inwardly extending portion 34 which is associated with cam assembly D as will hereinafter be more fully described. It will be appreciated that by turning adjustment knob 24, a corresponding movement in the cam assembly adjustment arm and inwardly extending portion are realized, which movement is ascertainable from the position of indicator 28 relative to time delay designations 14.

Figure 8:
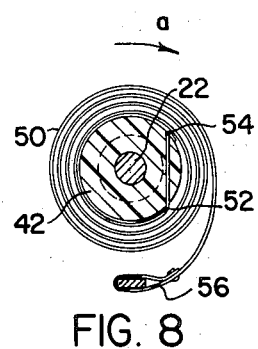
FIG. 8 is a cross sectional view taken along lines 8—8 in FIG. 6 and showing the cam member return coil spring.

The cam assembly D includes a cam member generally designated 40 and including a cam hub 42 and cam arm 44. Although the cam member may be constructed from a number of materials, in the preferred embodiment, a molded plastic member is employed. The cam hub includes on one face thereof a plurality of radially extending serrations 46 molded integrally therewith. Further, cam hub 42 is adapted to be received coaxially over drive shaft 22 in a free wheeling relationship therewith. Associated with cam member 40 is a return spring assembly generally designated 50 (FIG. 8) which comprises a torsion spring. This spring may be constructed from any light spring-like material and, in the preferred embodiment, a light spring steel is utilized. Spring 50 has one end 52 received in a slot 54 in the cam hub and the other end 56 stationarily mounted to another portion of the reset timer or the timer housing. An embodiment shown in FIGS. 1-7, return spring assembly 50 is designed to continuously bias cam member 40 in direction a against inwardly extending portion 34. Cam arm 44 also includes a pair of adjustable cam tabs 60, the operation of which will be hereinafter more fully described. In the preferred embodiment, these adjustable tabs comprise set screws which are threadably received in the cam arm.

Figure 5:
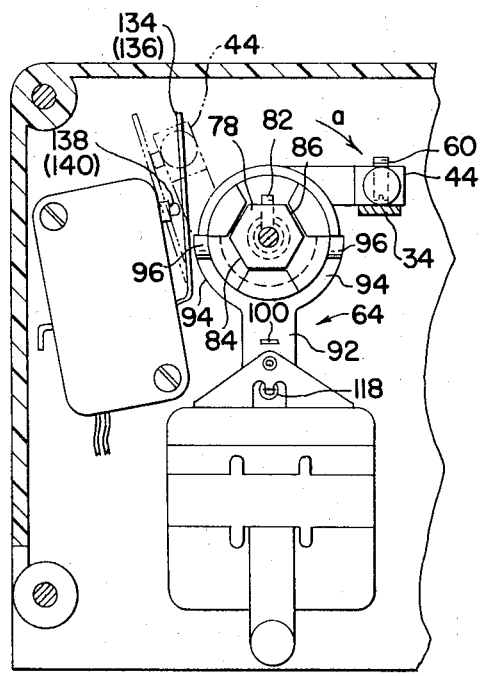
FIG. 5 is a cross sectional view taken along lines 5—5 in FIG. 1.
Figure 6:
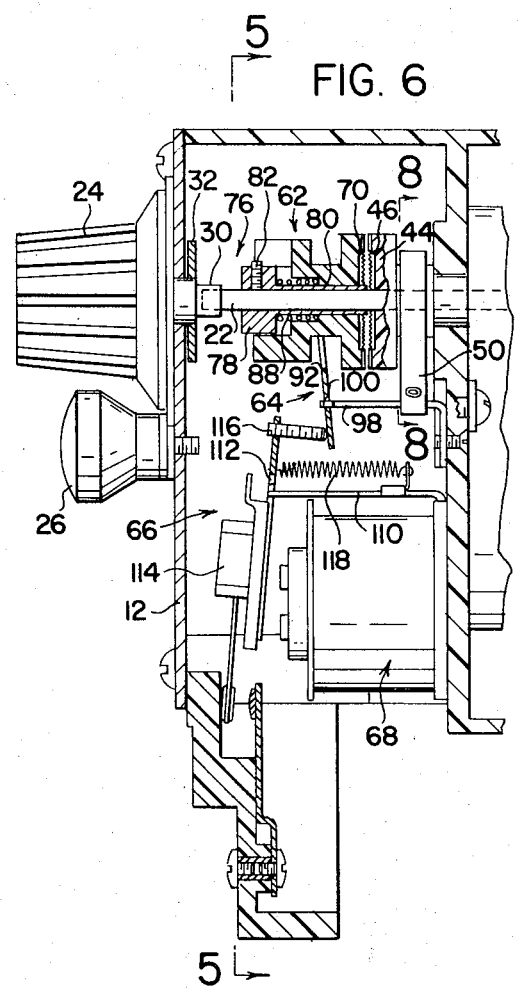
FIG. 6 is a cross sectional view taken along lines 6—6 in FIG. 1.
Figure 7:
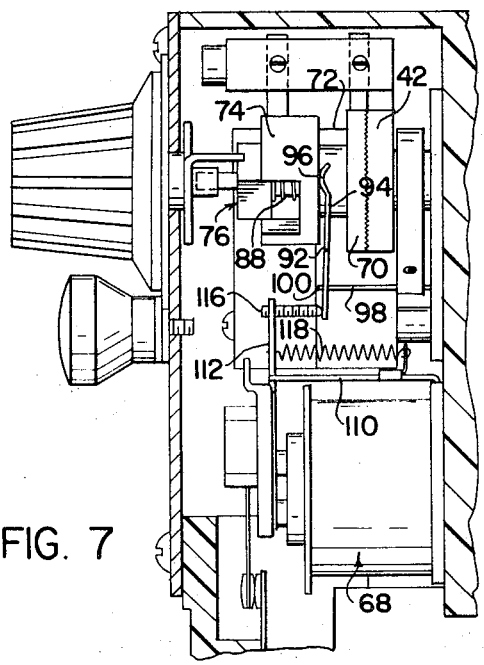
FIG. 7 is a view similar to FIG. 6 showing the relay clutch in the engaged position.

The clutch assembly E is best shown in FIGS. 5, 6 and 7 and comprises a clutch hub generally designated 62, a lever generally designated 64, an operating linkage generally designated 66, and an electrical relay member generally designated 68. More specifically and with reference to clutch hub 62, it will be seen in the FIGURES that one face thereof includes a plurality of radially extending serrations 70 adapted to be matingly engaged by serrations 46 on the cam hub. The hub further includes a lever receiving groove 72 extending circumferentially therearound and an end body portion 74. Although this clutch hub may be constructed from a plurality of materials, in the preferred embodiment, a molded plastic hub is utilized. As best seen in FIGS. 5 and 6, the clutch hub is received coaxially over drive shaft 22 along with a retaining sleeve 76. Retaining sleeve 76 includes a head portion 78 and a sleeve portion 80 which is adapted to extend inwardly through the clutch hub. Retaining sleeve 76 is rigidly affixed to drive shaft 22 by threaded fastener 82 so that it will rotate therewith. In order to have the clutch hub also rotate with the drive shaft, the head portion of the retaining sleeve includes a plurality of flats 84 extending therearound to engage a plurality of cooperating flats 86 on end portion 74. The clutch hub is received over the retaining sleeve in a free-fitting relationship whereby the hub is relatively free to move axially along the retaining sleeve. Disposed over sleeve 80 and between head portion 78 and hub 62 is a coil spring which normally biases the clutch hub toward the cam hub so that serrations 46, 70 will mate and form a driving connection therebetween.

In order to retain the clutch hub in a non-engaging relationship relative to the cam hub, lever 64 is provided. The lever is comprised of a body member 92 having a pair of diverging legs 94 which include end portion engaging protrusions 96 thereon. Legs 94 are spaced apart so as to be received in lever receiving groove 72 in order to act upon end portion 74. Mounted by any convenient means to the rear wall of shell 10 is an L-shaped leg-like member 98. This leg-like member includes a mounting tab 100 which extends through an opening in body member 92 so that the member is pivotally mounted relative thereto. A second L-shaped leg-like member 110 mounted by convenient means immediately above relay 68 pivotally receives a second lever 112. Lever 112 includes a plastic backing member 114 and an adjustment member 116 which is disposed to contact the lower portion of body member 92. In the preferred embodiment, adjustment member 116 comprises a set screw although other arrangements may be employed. A coil spring 118 has one end mounted to lever 112 and the other end affixed to leg-like member 110 by any convenient means so as to draw the top portion of lever 112 and adjustment member 116 inwardly against the lower portion of body member 92. In the preferred embodiment, the spring force of spring 118 acting against lever 112 which in turn acts against body member 92 is of sufficient force so as to overcome the spring force of coil spring 88 so that in the normally de-energized condition, clutch hub 62 assumes a non-engaging relationship relative to cam hub 44.

Electrical relay 68 may be of any type adapted for use with the subject type of reset timer, it merely being necessary that when the relay is energized, the lower portion of lever 112 is drawn toward the face of the relay by the magnetic force created so that the retaining force exerted by lever 64 is released to permit spring 88 to direct the clutch hub into an engaging relationship with the cam hub. This second position is best shown in FIG. 7. When relay 68 is de-energized, coil spring 118 again forces the upper portion of lever 112 and adjustment member 116 to act against body portion 92 to move the clutch hub to the non-engaging position.

Figure 2:
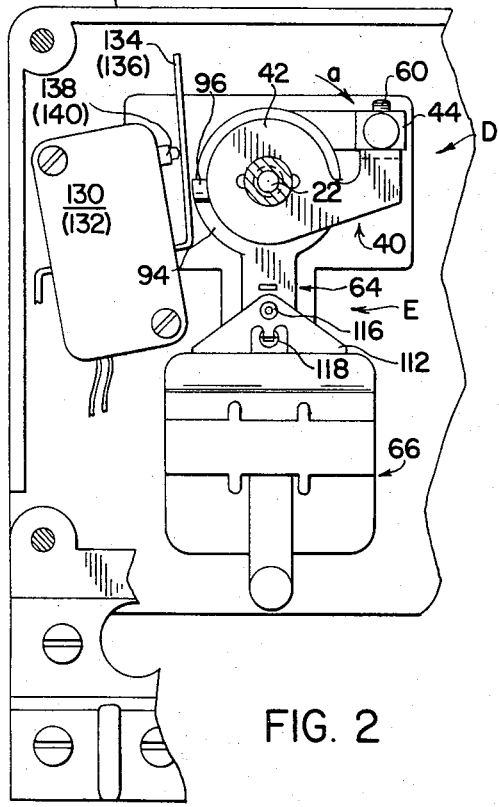
FIG. 2 is a cross sectional view taken along lines 2—2 in FIG. 1.
Figure 4:
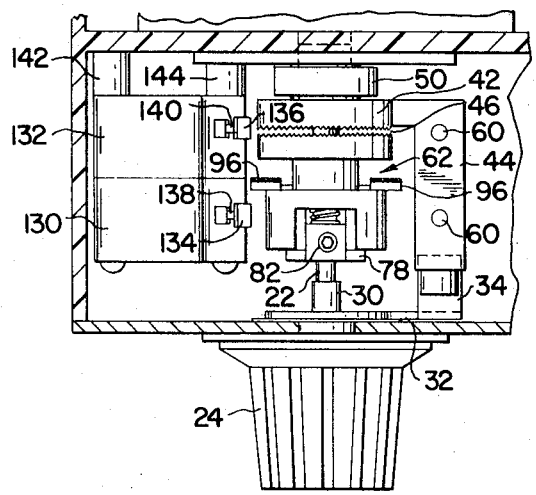
FIG. 4 is a cross sectional view taken along lines 4—4 in FIG. 1.

Referring now to FIGS. 2, 4 and 5, it will be seen that disposed on one side in shell 10 are a pair of load switches generally designated 130,132. The switches are adapted to control a process or apparatus circuit speed remote from the subject timer device. These switches may comprise any type of switch generally associated with this type of control function and include lever actuating means 134,136 adapted to energize the load switches in a known manner when biased downwardly against switch contact points 138,140. These load switches may be mounted by any convenient means relative to shell 10 and, in the preferred embodiment, these fastening means comprise elongated screws passing through the switches and into mounting pedestals 142,144 formed integrally with the shell.

Figure 3:
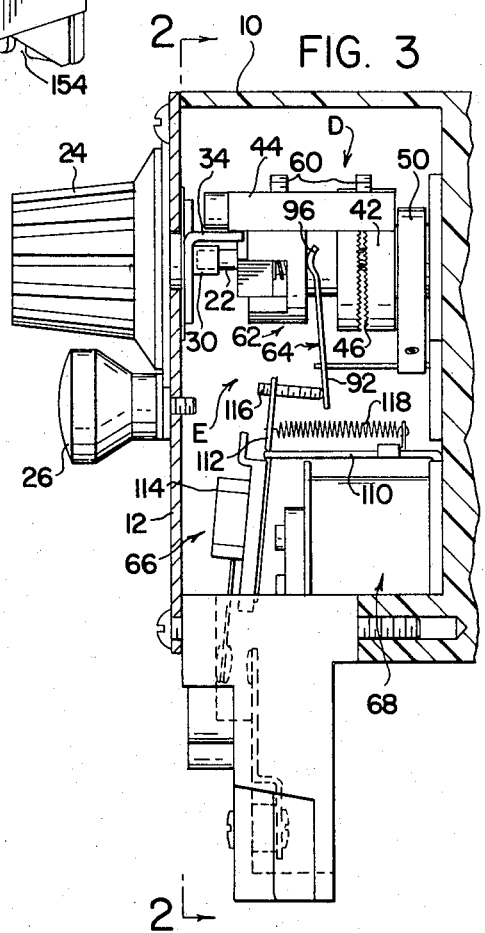
FIG. 3 is a cross sectional view taken along lines 3—3 in FIG. 1.

Referring specifically to FIGS. 1 and 3, it will therein be seen that a separate wiring harness member designated F is therein included. Wiring harness F is a molded plastic member which may be connected to shell 10 by any convenient means which, in the preferred embodiment, comprise elongated bolt members passing therethrough and into the shell. The wiring harness includes a plurality of contact areas for conveniently interconnecting the timer with the necessary electrical supply and load switches 130,132 to the process or apparatus which is to be controlled thereby. It will be appreciated that harness F may be similar to those wiring harnesses generally associated with the art.

For mounting the timer in a convenient location, it will be noted, and again with reference to FIG. 1, that shell 10 includes feet 150,152 molded integrally therewith. Spaced along these feet are a plurality of inwardly extending slots 154 for receiving mounting means such as screws or the like.

Reference will now be made to operation of the switch in its preferred environment. It will be appreciated that the timer itself and load switches 130,132 may be electrically interconnected to perform any function. Assume for the purposes of this example, however, that it is desired to control a process which is to be turned on, run for a selected time interval, and then shut off. In the embodiment shown in FIG. 1, the time interval is set for 9 seconds by unloosening tightening knob 26 and turning adjustment knob 24 until time delay indicator 28 corresponds with the number 9 of time delay designations 14. When this has been set, tightening knob is again tightened to prevent any variation from this desired sequence. The adjustment of knob 24 causes a corresponding movement of cam assembly adjustment arm 32 and inwardly extending portion 34 to move cam member 40 to a first position spaced from switches 130,132. It will be appreciated that for a longer time interval, cam arm 44 is disposed further from the load switches and for a shorter time sequence, it is spaced closer thereto. The force of return spring assembly 50 retains cam member 40, and in particular, cam arm 44 against inwardly extending portion 34. It should be here noted that the spacing of time delay designations 14 on the face plate are dictated by the speed at which drive shaft 22 is driven by the synchronous drive motor. In this preset condition, the clutch assembly and cam assembly assume the condition best shown in FIGS. 2, 3 and 6, that is, with serrations 46, 70 in a non-engaging relationship. Synchronous motor 20 may be operating at this time if so desired as it will only cause clutch hub 62 to rotate with drive shaft 22. Once relay 68 is energized by whatever triggering means is desired, however, lever 112, and as best shown in FIG. 7, is pivoted about leg-like member 110 so as to release the force against the cam hub exerted by legs 94 of body member 92. With this release, coil spring 88 directs clutch hub 62 axially along drive shaft 22 toward cam hub 42 until serrations 46, 70 engage to form a driving connection therebetween. The cam member is then driven arcuately along with the clutch hub from its initial position toward contact with load switches 130,132. This driving action is against the spring force exerted in direction a by return spring assembly 50. The cam member is driven through this arcuate path until cam tabs 60 contact lever actuating means 134,136 to drive them into engagement with contacts 138,140 respectively which is best shown in FIG. 5. At this position, switches 130,132 are energized to perform their desired function and, at the same time, relay 68 is wired to be de-energized whereupon coil spring 118 causes lever 112 to be pivoted away from contact with the relay and corresponding movement of body portion 92 so that clutch hub 62 is directed axially outwardly from contact with cam hub 42. As soon as serrations 46, 70 disengage, return spring assembly 50 causes cam member 40 to be directed in direction *a* to again contact the inwardly extending portion at the initial predetermined position in readiness for another timed cycle. Switches 138,140 may be electrically interconnected to perform any desired controlling function and relay 68 may be so wired with these switches to operate in any desired manner, such as for example, where the relay is normally energized. That is, a reversal of the hereinabove described preferred wiring relative to relay 68. It will also be appreciated that the number of load switches is not limited to two but may be increased or decreased as deemed necessary to perform a desired timing function.

It should be noted that adjustable cam tabs 60 may be adjusted in their mounted position relative to cam arm 44 so that switches 130, 140 are energized at different times, again, depending upon the requirements of the circuit to be controlled.

Figure 9:
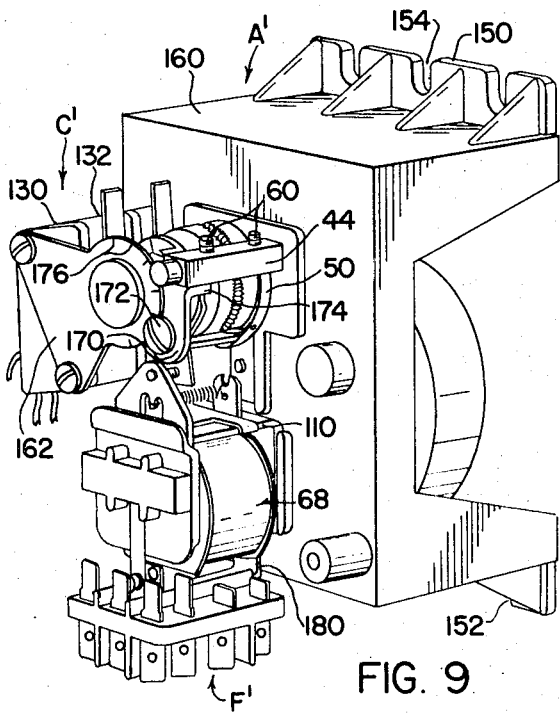
FIG. 9 is a second embodiment of a reset cycle timer employing the concepts of the subject invention.
Figure 11:
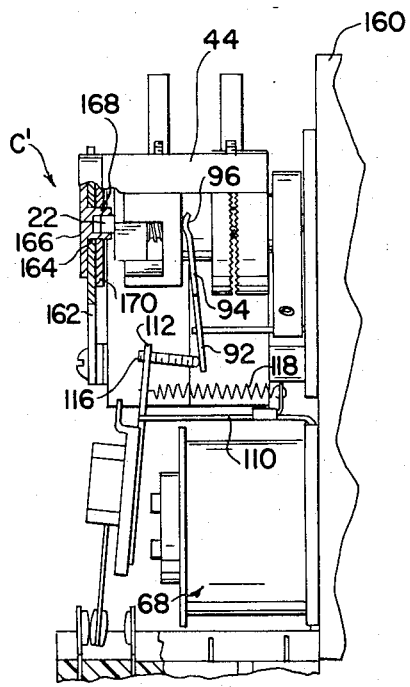
FIG. 11 is a side view of the reset cycle timer shown in FIG. 9.
Figure 10:
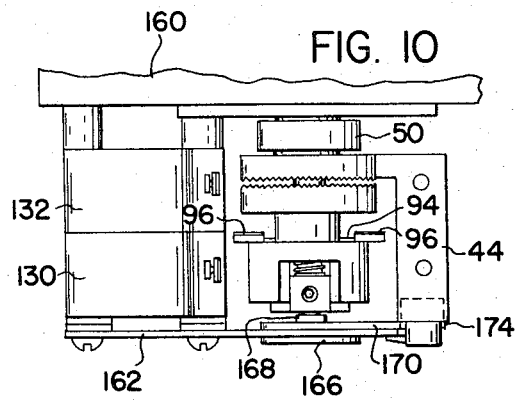
FIG. 10 is a top view of the timer shown in FIG. 9.

FIGS. 9-11 are directed to a second embodiment utilizing the concepts of the subject invention which embodiment shows a simpler, les expensive timer. As the component parts of this embodiment are substantially identical with the embodiment described relative to FIGS. 1-8, like components are numbered with like numerals and different components are numbered with new numerals. With reference to FIGS. 9-11, it will be seen that timer housing A' is comprised of a smaller molded plastic shell 160 again injection molded from glass filled Noryl. Essentially, shell 160 provides a single surface for mounting drive means B, cam assembly D and clutch assembly E. It is to be noted that in this embodiment feet 150,152 which include grooves 154 are also included. A second substantial difference is the simplification of adjustment assemblies C'. In the FIGURES, the adjustment assembly includes a cover plate 162 mounted relative to load switches 130,132 by the elongated mechanical fasteners passing therethrough which passes at least over the end of drive shaft 22. Cover plate 162 includes a cam member locking arm receiving hole 164 extending therethrough coaxially with drive shaft 22. A rivet-like member having a head portion 166 and a hollow body portion 168 is received on the outside of plate 162 to extend therethrough so that the hollow body portion is received over the end of drive shaft 22. A cam member stop arm 170 is tightly received on body portion 168 on the inside of plate 162 to retain the rivet-like member in position. The rivet-like member and arm are so positioned that they may be pivoted around drive shaft 22. Arm 170 includes a threaded member 172 therein which is also receivable over the edge of plate 162 in order that arm 170 may be tightly positioned to establish a normal position for cam member 40 in cooperation with cam arm 44. To move the position either toward or away from switches 130,132 it is merely necessary to loosen threaded member 172 and pivot arm 170 around the drive shaft. When the desired position is reached, threaded member 172 is retightened. If desired, a plurality of indicator marks may be spaced around the periphery of plate 162 to provide an approximate indicator of time sequences.

It should be further noted, with particular reference to FIG. 9, that the wiring harness F' is further simplified from the first embodiment in order to further reduce costs involved. In this instance, the bulk of the wiring harness is substantially reduced and is mounted to an L-shaped bracket 180 by any convenient means. In this embodiment, L-shaped bracket 180 may comprise a portion of or be an extension of leg-like member 110 utilized in the first embodiment.

The operation of the timer shown in FIGS. 9-11 is the same with that as hereinabove described relative to the timer shown in FIGS. 1-8.

Obviously, other modifications to simplify or expand upon a reset timer employing the concepts of the subject invention is entirely possible. Further, it should be noted that by changing the linkage arrangement between levers 64,112, that it is possible to provide a switch wherein clutch hub 62 is normally in the engaging position relative to cam hub 42 and that upon energization of electrical relay 68, the cam hub is moved to the non-engaging position. This is a rather simple alteration and merely involves reversing the operation between the levers involved.

The invention has been described with reference to preferred embodiments. Obviously, modifications and alterations will occur to others upon the reading and understanding of this specification. It is my intention to include all such modifications and alterations insofar as they come within the scope of the appended claims or the equivalence thereof.

Having thus described my invention, I now claim:

1. A clutch mechanism for use in a reset timer having a drive shaft for driving said timer, motor means for rotating said drive shaft, a cam member disposed on a cam hub, said cam hub disposed about said drive shaft, said clutch mechanism operating to selectively engage and disengage said drive shaft with said cam hub to arcuately drive said cam between non-energizing and energizing modes relative to at least one load switch, said clutch mechanism comprising:

a clutch hub received on said drive shaft for continuous rotation therewith, said clutch hub being axially movable along said drive shaft between a first non-engaging position and a second position in direct engagement with said cam hub for driving said cam member between non-energizing and energizing modes;

biasing means for continuously biasing said clutch hub toward one of said positions;

retaining means for retaining said clutch hub in the other of said positions against said biasing means comprising a movable lever with one end engaging a surface of said clutch hub;

shifting means for selectively shifting said retaining means to allow said biasing means to move said clutch hub to said one of said positions and to move said clutch hub to said other position against said biasing means.

2. A clutch mechanism as defined in claim 1 wherein said cam hub and said clutch hub include radially serrated face portions for connecting engagement with each other.

3. A clutch mechanism as defined in claim 2 wherein said movable lever of said retaining means includes a pair of diverging legs at one end thereof, each of said legs coacting with opposite sides of said clutch hub.

4. A clutch mechanism as defined in claim 3 wherein said shifting means comprises an electrical relay disposed in an operative relationship with said movable lever whereby when said relay is energized, said lever is magnetically coupled therewith to retain said clutch hub in said one position and when said relay is de-energized, said clutch hub is permitted to move to said other position.

* * * * *